United States Patent [19]
Pfeifer et al.

[11] Patent Number: 5,960,676
[45] Date of Patent: Oct. 5, 1999

[54] INDEXING APPARATUS AND METHOD FOR CONTROLLING THE INDEXING APPARATUS

[75] Inventors: Wolfgang Pfeifer, Esslingen, Germany; Kenji Sugimoto, Tokyo; Hiroshi Shinohara, Kawagoe, both of Japan

[73] Assignee: Citizen Watch Co., Ltd., Tokyo, Japan

[21] Appl. No.: 08/945,339

[22] PCT Filed: Dec. 13, 1996

[86] PCT No.: PCT/JP96/03661

§ 371 Date: Oct. 27, 1997

§ 102(e) Date: Oct. 27, 1997

[87] PCT Pub. No.: WO98/25730

PCT Pub. Date: Jun. 18, 1998

[51] Int. Cl.[6] .................................................. B23Q 16/00
[52] U.S. Cl. ...................... 74/813 C; 74/813 R; 74/815; 198/832.1
[58] Field of Search .............................. 74/813 R, 813 L, 74/813 C, 815, 816, 820; 198/345.2, 832.1, 810.01

[56] References Cited

U.S. PATENT DOCUMENTS

| | | | |
|---|---|---|---|
| 4,177,696 | 12/1979 | Moss | 74/813 C |
| 4,318,465 | 3/1982 | Calvert et al. | 198/832.1 |
| 4,469,993 | 9/1984 | Swanson et al. | 198/832.1 |
| 4,944,198 | 7/1990 | Natale et al. | 74/813 R |
| 5,735,180 | 4/1998 | McMurtry | 74/813 R |

FOREIGN PATENT DOCUMENTS

| | | |
|---|---|---|
| 56-82152 | 7/1981 | Japan . |
| 2-41806 | 2/1990 | Japan . |
| 03019753 | 1/1991 | Japan . |
| 03111149 | 5/1991 | Japan . |
| 4-70454 | 6/1992 | Japan . |
| 7-51996 | 2/1995 | Japan . |

*Primary Examiner*—Thomas R. Hannon
*Assistant Examiner*—Chong H. Kim
*Attorney, Agent, or Firm*—Armstrong, Westerman, Hattori, McLeland & Naughton

[57] ABSTRACT

An indexing device comprising a base table (10), a turret (11) which indexes about a given rotary center relative to the base table (10), a pair of positioning engaging members (27) provided between the base table (10) and the turret (11), wherein at least one of the positioning engaging members (27) has an inclined tooth profile, and the positioning engaging members (27) are engageable with and disengageable from each other relative to the tooth profiles when they move in axial directions thereof relative to each other. The meshing of the tooth profiles are maintained by applying a pressing force to at least one of the positioning engaging members (27). When the turret (11) receives a load, a positioning displacement which occurs between the pair of positioning engaging members (27) is detected, and the pressing force applied to the positioning engaging members (27) is adjusted based on the result of detection.

4 Claims, 9 Drawing Sheets

INDEXING APPARATUS AND METHOD FOR CONTROLLING THE INDEXING APPARATUS

TECHNICAL FIELD

The present invention relates to an indexing device for use in machine tools, etc. and a method of controlling the same, particularly to an indexing device adapted for a turret device used by a lathe, and a method of controlling the indexing device.

BACKGROUND TECHNOLOGY

There has been recently an increasing demand for an NC lathe provided with a turret device since a machining apparatus, particularly, a lathe is able to realize automatic machining operations at high speed and can cope with a computer-integrated flexible manufacturing system.

The turret device is structured such that a rotary table called a turret which is provided on a tab base table (tool slide), and has normally 5 to 12 indexing positions, is indexed while rotated (hereinafter referred to as simply indexed). Tool mounting portions are formed on an outer periphery or end surface of the turret, and various tools such as turning tools and drills are mounted on these tool mounting portions wherein an appropriate tool is selected from the various tools depending on the type of machining process desired so as to index the selected tools in machining positions.

In indexing devices such as the turret, a pair of positioning engaging members which are engageable with and disengageable from each other are provided so that the selected tool is indexing in a given indexing position, and the tool which was arranged in the indexing position is positioned and fixed to the indexing position.

This pair of positioning engaging members is provided between the base table and a turret, wherein the turret may be freely indexing or may be positioned and fixed to a given indexing position when the positioning engaging members engage with or disengage from each other.

In the turret device of the NC lathe, crown gears having inclined tooth profiles such as curvic couplings which mesh with each other are generally employed as the positioning engaging members. In the positioning engaging member of this type, when a turret side coupling is moved in the axial direction relative to a base table side coupling, the engagement and disengagement between these couplings is performed.

The positioning engaging members of this type are needed to apply a large pressing force in the axial directions thereof to maintain the engagement therebetween owing to the meshing between the tooth profiles. If the pressing force in the axial direction is small, there occurs a situation that one of the positioning engaging members rises along each tooth flank of the inclined tooth profile under the load applied to the turret, for example, by the cutting resistance which is applied to the tools mounted on the turret.

Accordingly, a sufficiently large pressing force has been conventionally applied to the positioning engaging members in the axial direction thereof, thereby preventing the positioning engaging members from rising under the load.

However, energy is wasted when the sufficiently large pressing force is applied to the positioning engaging members in the axial direction thereof even if no load is applied to the turret (for example, when the tool mounted on the turret does not perform the cutting operation) or when the load is small. Further, if such a large pressing force is applied, a large surface pressure is generated between tooth flanks of the positioning engaging members, which causes abrasion and increases the temperature of the driving source of the pressing force, thereby generating heat and causing heat deformation.

The present invention has been made in view of these circumstances, and it is the object of the invention to control the pressing force applied to the positioning engaging members appropriately in response to the load applied to the rotary table.

DISCLOSURE OF THE INVENTION

To achieve the above object, the present invention is structured such that it comprises a base table, a rotary table which indexes about a given rotary center relative to the base table, a pair of positioning engaging members provided between the base table and the rotary table, at least one of the positioning engaging members having inclined tooth profiles, the positioning engaging members being engageable with and disengageable from each other relative to the tooth profiles when they move in axial directions thereof relative to each other, and a pressing means for pressing at least one of the positioning engaging members in the axial direction thereof to permit one of the positioning engaging members to engage with the other positioning engaging member, wherein the indexing device further comprises a positioning displacement detecting means for detecting positioning displacement which occurs between said pair of positioning engaging members when one of said positioning engaging members slides along inclinations of said tooth profiles when the rotary table receives a load, and a pressing force control means for controlling a pressing force of the pressing means in response to an output of said positioning displacement detecting means.

Further, the present invention provides a method of controlling an indexing device comprising a base table, a rotary table which indexes about a given rotary center relative to the base table, and a pair of positioning engaging members provided between the base table and rotary table, at least one of said positioning engaging members having inclined tooth profiles, said positioning engaging members being engageable with and disengageable from each other relative to the tooth profiles when they move in axial directions relative to each other.

That is, the method of controlling the indexing device comprises maintaining the engagement of the positioning engaging members relative to the tooth profiles by applying a pressing force to at least one of the pair of positioning engaging members, detecting the positioning displacement which occurs between the pair of positioning engaging members when the rotary table receives a load, and adjusting the pressing force applied to the pair of positioning engaging members based on the result of detection.

The pair of positioning engaging members engage with each other by the meshing of the tooth profiles which occurs when they are pressed by the pressing means in the axial direction, thereby positioning and fixing the rotary table. When the load is applied to the rotary table which was thus positioned and fixed, there occurs positioning displacement between the positioning engaging members owing to the sliding along the inclination of the tooth profiles.

The positioning displacement between the positioning engaging members is detected by the positioning displacement detecting means. The pressing force control means controls an output (pressing force) of the pressing means in response to the output of the positioning displacement detecting means.

For example, if the pressing force of the pressing means is set to a small value in the initial setting thereof, and the pressing force of the pressing means is increased based on the magnitude of the positioning displacement which is detected by the positioning displacement detecting means, the pressing force can be adjusted to a proper value depending on the load which the rotary table receives.

Further, the present invention comprises calculating the rate of variation of the positioning displacement with time which displacement occurs between the pair of positioning engaging members during the engagement state, increasing the pressing force when the positioning displacement tends to increase, and decreasing the pressing force when the positioning displacement tends to decrease.

With such an arrangement, even if the load which the rotary table receives varies with time, the variation of the positioning displacement caused by the load is discriminated by the variation of the positioning displacement with time which displacement occurs between the positioning engaging members, thereby adjusting the pressing force to a proper value.

The method of controlling the indexing device comprises providing the maximum allowable value to the positioning displacement which occurs between the pair of positioning engaging members during the engaging state, adjusting the pressing force between the pair of positioning engaging members within a given range not to exceed the maximum allowable value, and decreasing the load applied to the rotary table in a turning direction when the positioning displacement which occurs between the pair of positioning engaging members exceeds the maximum allowable value or the pressing force exceeds an upper limit of the given range.

With such an arrangement, if there is a possibility that the indexing device might be broken when the load is excessively applied to the rotary table, the load generating source per se relative to the rotary table can be controlled, thereby removing the excessive load and preventing any breakage of the indexing device in advance.

BEST MODE FOR CARRYING OUT THE INVENTION

An indexing device applied to a turret device of a turret NC lathe according to a preferred embodiment of the invention will be now described in detail with reference to the attached drawings.

Figure 1:
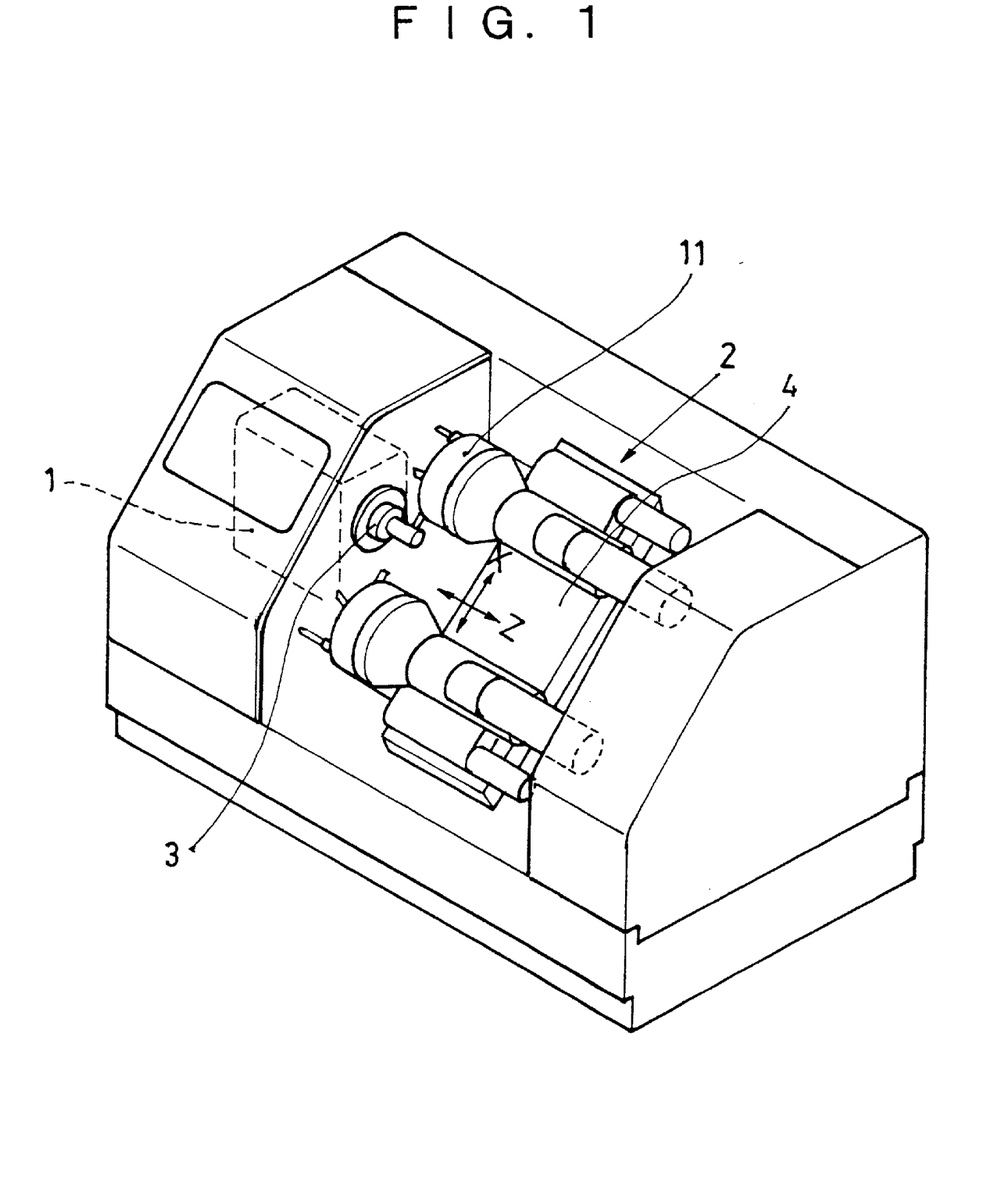
FIG. 1 is a perspective view showing an external configuration of a turret NC lathe.

FIG. 1 is a perspective view showing an external configuration of the turret NC lathe. As shown in the same figure, the turret NC lathe comprises a headstock 1 and a turret device 2. The headstock 1 has a chuck 3 mounted thereon for holding a workpiece, and the headstock 1 serves to rotate the workpiece held by the chuck 3 by a main spindle motor (not shown) incorporated therein.

Various tools necessary for a cutting processes can be mounted on the turret device 2, and a turret 11 (two turrets 11 with the workpiece interposed therebetween in FIG. 1) is provided on the turret device 2 for appropriately selecting the tool and cutting the workpiece held by the chuck 3 of the headstock 1. The cutting process can be performed by moving a tool slide 4 provided on the turret device 2 in the direction of a main spindle center line (Z axis) and in the direction of an X axis which crosses at right angles with the main spindle center line.

Figure 2:
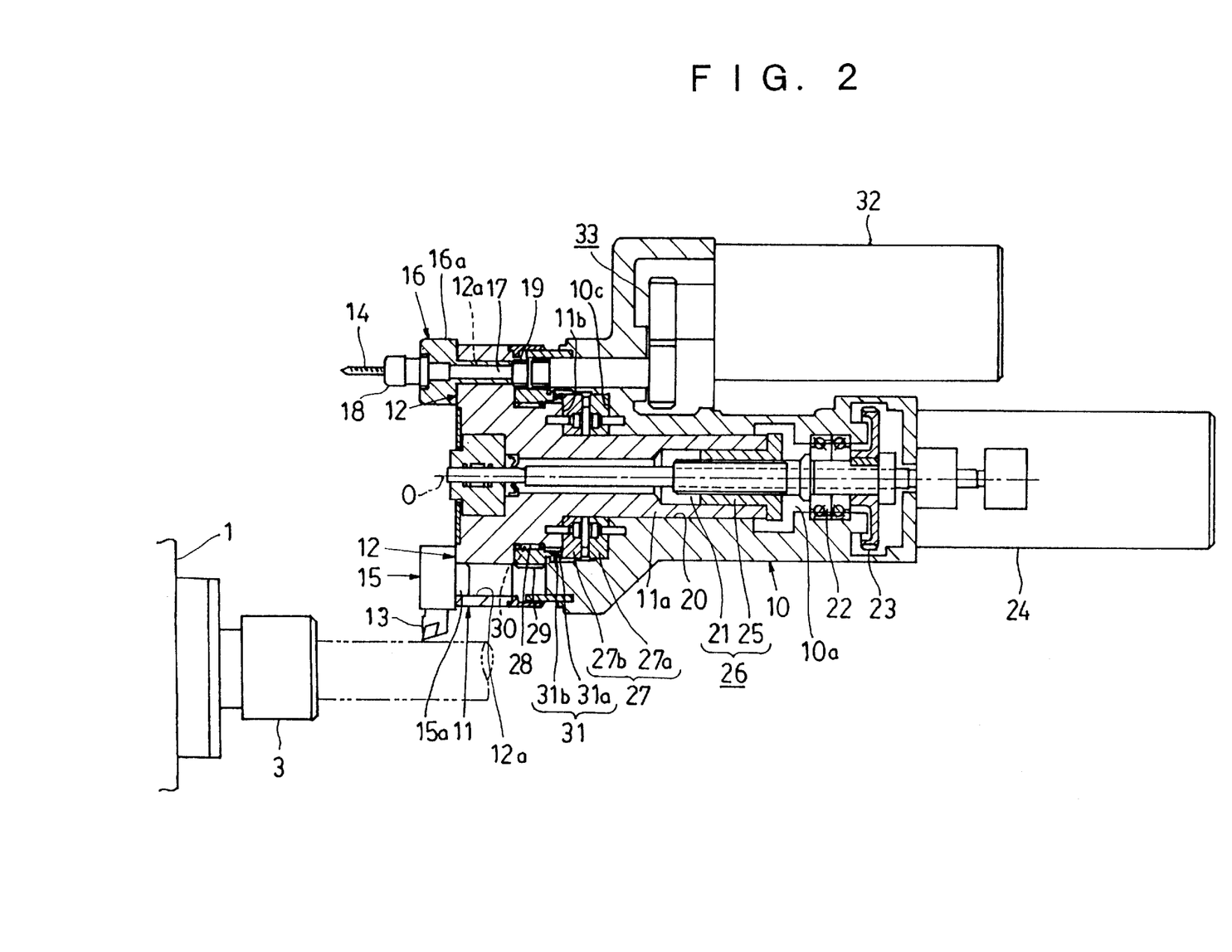
FIG. 2 is a sectional plan view of a turret device to which an indexing device of the invention is applied.

FIG. 2 is a sectional plan view of the turret device to which the indexing device of the invention is applied.

The turret device 2 comprises a base table 10 provided on the tool slide 4 and a turret (rotary table) 11 which is rotatably mounted on the base table 10. The tool slide 4 is driven in the directions of the Z and X axes by a tool slide driving apparatus, not shown.

A plurality of tool mounting portions 12 are provided on a front end outer peripheral edge of the turret 11 with given indexing angles. A cutting tool 13 such as a turning tool secured to a tool holder 15 and a rotary tool 14 such as a drill secured to another tool holder 16 can be mounted on the tool mounting portions 12.

The tool holder 15 of the cutting tool 13 can be firmly fixed to the tool mounting portion 12 such that a protrusion 15a formed on the tool holder 15 is inserted into and positioned in a mounting hole 12A defined in the tool mounting portion 12, and they are firmly fixed to each other by a fastening device such as a bolt, not shown.

The tool holder 16 of the rotary tool 14 has a rotatable tool rotary shaft 17 which penetrates the center of a holder body 16a, and a tool chuck 18 for holding the rotary tool 14 is provided at the tip end of the tool rotary shaft 17. Further, a tool rotary gear 19 is provided at the base end of the tool rotary shaft 17.

The tool holder 16 of the rotary tool 14 is firmly fixed to the tool mounting portion 12 such that the holder body 16a is inserted into the mounting hole 12a which is bored in the tool mounting portion 12 of the turret 11, and they are firmly fixed to each other by a fastening device such as a bolt, not shown. At this time, the tool rotary gear 19 provided at the base end of the tool rotary shaft 17 penetrates the turret 11 and protrudes backward.

The tool mounting portions 12 of the turret 11 and the tools may be structured in the same manner as the known turret and mounting tools which are applied to machine tools in addition to the aforementioned structure.

A base end portion 11a formed in the small diameter part of the turret 11 is rotatable about a rotary center O via a slide bearing 20 formed in a hollow part 10a of the base table 10, and it is mounted on the base table 10 to be movable linearly along the rotary center O.

A ball screw 21 is provided in the hollow part 10a of the base table 10 coaxially with the rotary center O via a rolling bearing 22. A motive transmission gear 23 is secured to the base end of the ball screw 21.

A coupling motor 24 comprising of a servomotor is mounted on the base table 10. A driving gear, not shown, meshing with the motive transmission gear 23 is secured to the rotary shaft of the coupling motor 24, wherein the driving force of the coupling motor 24 is transmitted to the ball screw 21 via the driving gar and the motive transmission gear 23 so as to drive and turn the ball screw 21.

A nut 25 is screwed into the ball screw 21, and it is fixed to the base end portion 11a of the turret 11. Accordingly, the nut 25 moves linearly along the rotary center O as the ball screw 21 turns so that the turret 11 moves linearly along the rotary center O together with the nut 25. That is, the ball screw 21 and nut 25 structure or comprise a screw feed mechanism 26 for linearly moving the turret 11.

According to the present embodiment, the screw feed mechanism 26 and coupling motor 24 form a pressing means, described later, for permitting the positioning engaging members 27 to engage with or disengage from each other.

Further, the turret 11 has an annular gear 29 which is mounted coaxially to the rotary center O via a needle bearing 28. A gear meshing with the tool rotary gear 19 of the tool rotary shaft 17 and also with a gear for transmitting the driving force of an index motor 32, described later, is formed on the outer peripheral surface of the annular gear 29, and the inner peripheral surface of the annular gear 29 is rotatably supported by the needle bearing 28.

A recess 30 defined in the outer peripheral surface of the turret 11 serves as an inner ring of the needle bearing 28 so that the needle bearing 28 can be rotated relative to the turret 11 but is prevented from moving in the direction of the rotary center O. Accordingly, the needle bearing 28 moves together with the turret 11 in the same direction when the turret 11 moves linearly along the rotary center O.

Figure 3:
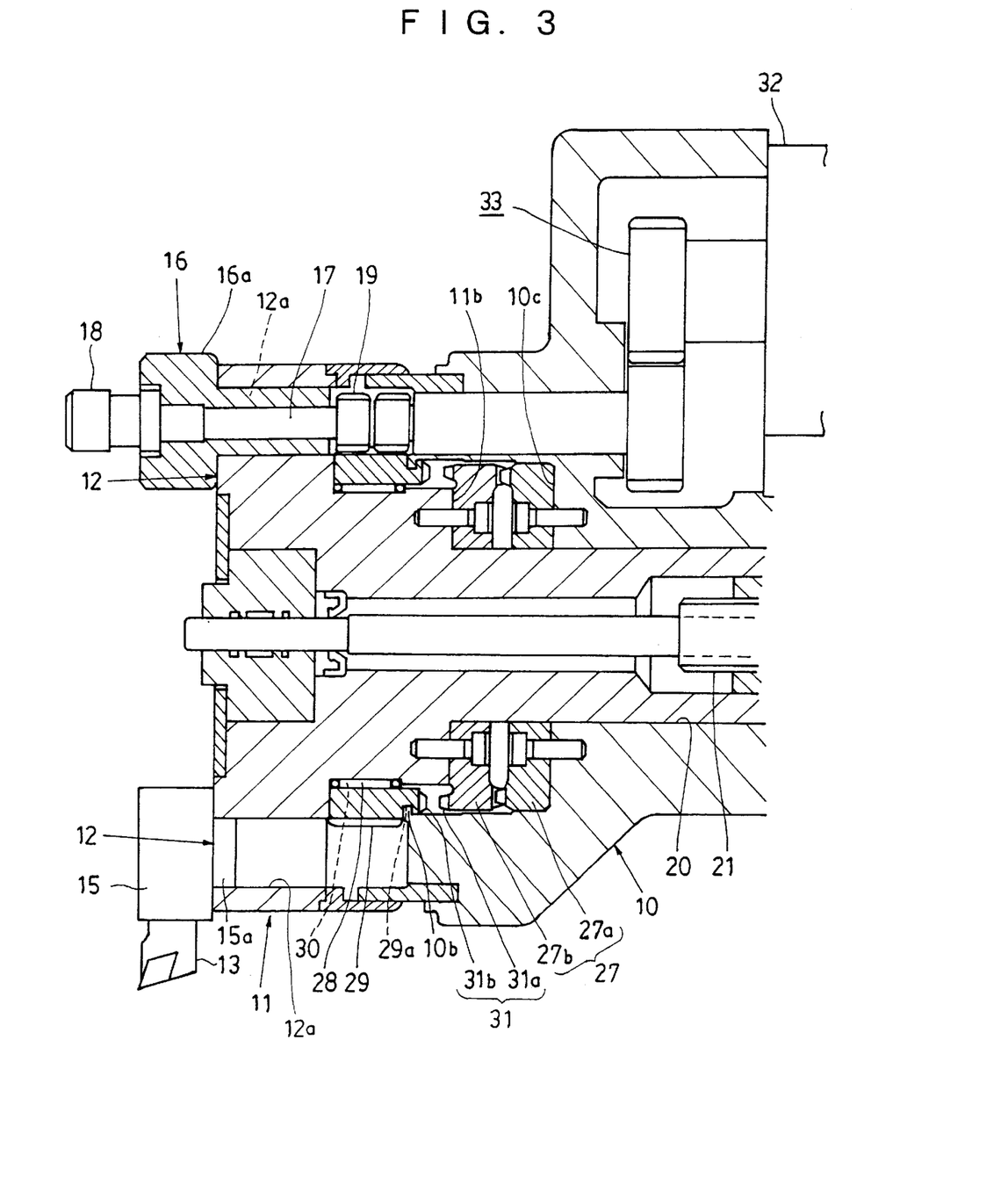
FIG. 3 is a enlarged sectional plan view showing a state where positioning engaging members engage with each other and clutch pieces disengage from each other.
Figure 4:
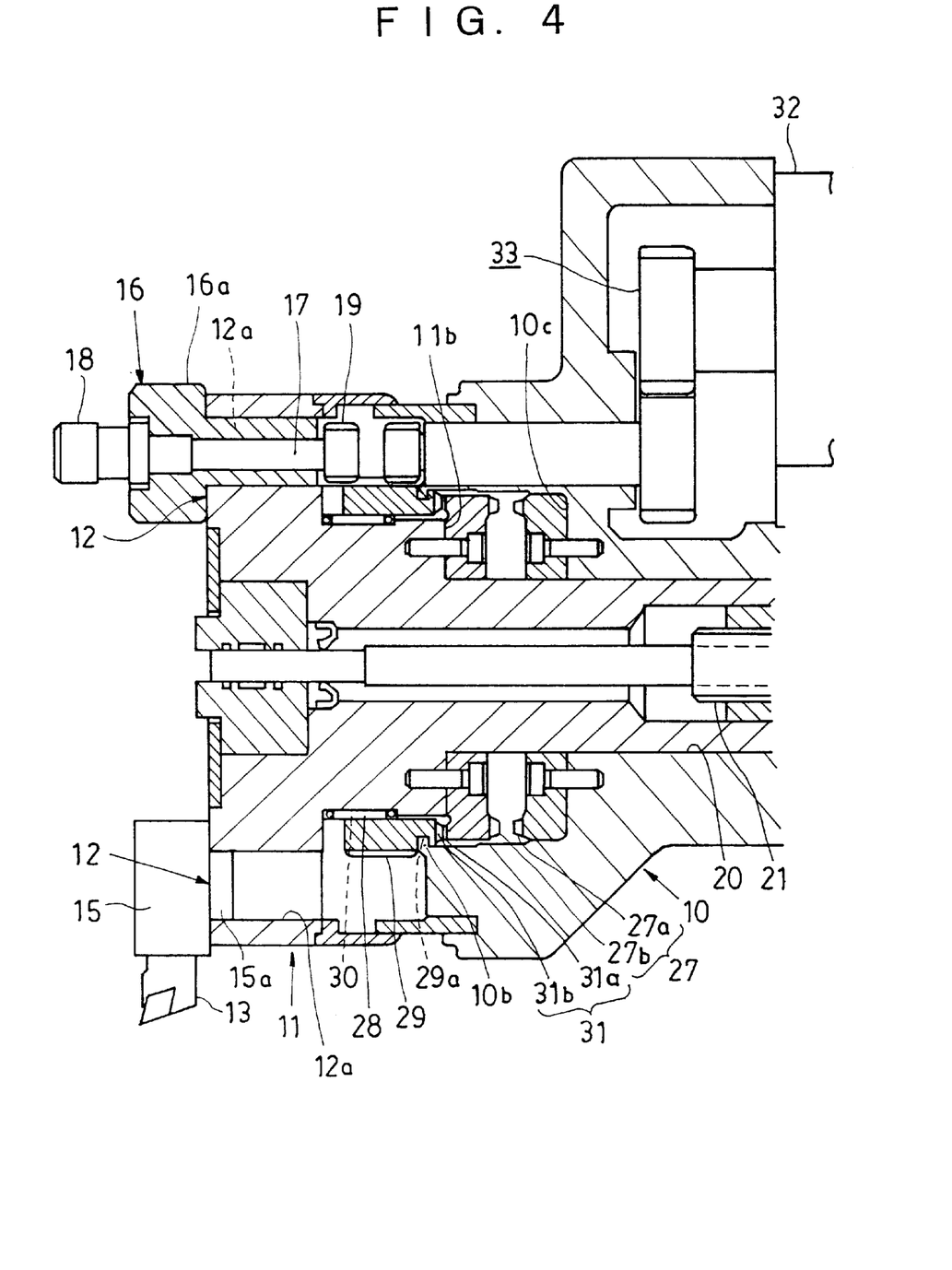
FIG. 4 is a enlarged sectional plan view showing a state where the positioning engaging members disengage from each other and the clutch pieces engage with each other.

The annular gear 29 is structured, as shown largely in FIGS. 3 and 4, so that a circumferential groove 29a defined in the rear end thereof engages with a protrusion 10b formed on the base table 10, wherein the annular gear 29 is held in a given position by the engagement between the groove 29a and protrusion 10b.

The hollow part 10a of the base table 10 has a large diameter part at the tip end side demarcating a stepped part 10c while the turret 11 has a large diameter part at the tip end side thereof demarcating a stepped part 11b. The stepped part 10c of the base table 10 and stepped part 11b of the turret 11 are provided with the positioning engaging member 27 at the surfaces thereof comprising a base table side coupling 27a and a turret side coupling 27b to form a curvic coupling.

Figure 9A:
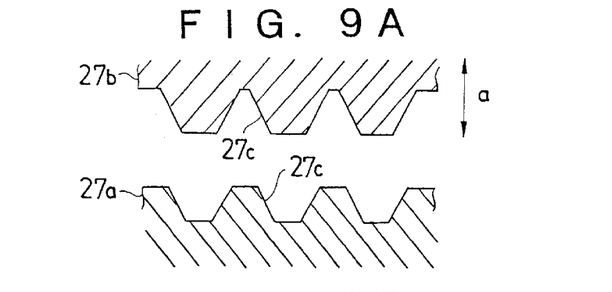
FIG. 9A is an enlarged sectional view of a tooth profile configuration of the positioning engaging members.
Figure 9B:
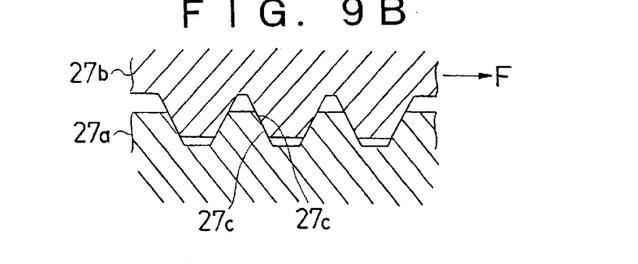
FIG. 9B is an enlarged sectional view of a tooth profile configuration of the positioning engaging members at a meshing state.

The couplings 27a and 27b are positioned with tooth profiles formed like a known crown gear meshing with each other, and they have inclined tooth profiles 27c respectively formed with given pitches as shown in FIGS. 9A and 9B. When the turret 11 moves linearly, the turret side coupling 27b fixed to the turret 11 moves in a direction denoted by a, tooth profiles 27c of the base table side coupling 27a and those of the turret side coupling 27b engage with each other or disengage from each other.

Clutch pieces 31a and 31b constituting a clutch member 31 are respectively formed at the rear end edge of the annular gear 29 and at the front surface of the turret side coupling 27b of the positioning engaging member 27 provided on the turret 11 so as to oppose each other. Inclined tooth profiles are formed on the surfaces of the clutch pieces 31a and 31b opposing each other with given pitches like those of the couplings 27a and 27b. These tooth profiles engage with or disengage from each other when the turret 11 moves linearly along the rotary center O.

The engagement and disengagement between clutch pieces 31a and 31b and between the couplings 27a and 27b have an opposite relationship. That is, when the turret 11 moves rightward relative to the base table 10 in FIG. 2, the couplings 27a and 27b engage with each other while clutch pieces 31a and 31b disengage from each other.

FIG. 3 is an enlarged view showing a state where the couplings 27a and 27b of the positioning engaging member 27 engage with each other to prevent the rotation of the turret 11 and the clutch pieces 31a and 31b of the clutch member 31 disengage from each other.

Since the turret 11 is prevented from rotating by the engagement between the couplings 27a and 27b in the state shown in the same figure, it cannot be indexed. When the turret 11 moves leftward relative to the base table 10 by the turning of the ball screw 21 as shown in FIG. 2, the couplings 27a and 27b disengage from each other, then the clutch pieces 31a and 31b engage with each other.

FIG. 4 is an enlarged view showing a state where the couplings 27a and 27b disengage from each other and the clutch pieces 31a and 31b engage with each other.

As shown in the same figure, the tool rotary gear 19 provided on the tool holder 16 of the rotary tool which is mounted on the tool mounting portion 12 of the turret 11 meshes with the annular gear 29.

The index motor 32 comprising a servomotor is mounted on the base table 10, and the driving force of the index motor 32 is transmitted to the annular gear 29 via a gear mechanism 33 so as to rotate the annular gear 29.

Accordingly, the index motor 32 rotates the annular gear 29 via the gear mechanism 33 in the state shown in FIG. 3 so that only the tool rotary shaft 17 provided on the tool holder 16 is rotated by the rotation of the annular gear 29 to drive and turn the rotary tool 14. Meanwhile, in the state shown in FIG. 4 where the couplings 27a and 27b disengage from each other and the clutch pieces 31a and 31b engage with each other, the rotation of the annular gear 29 is transmitted to the turret side coupling 27b fixed to the turret 11 so that the index motor 32 indexes the turret 11.

Figure 5:
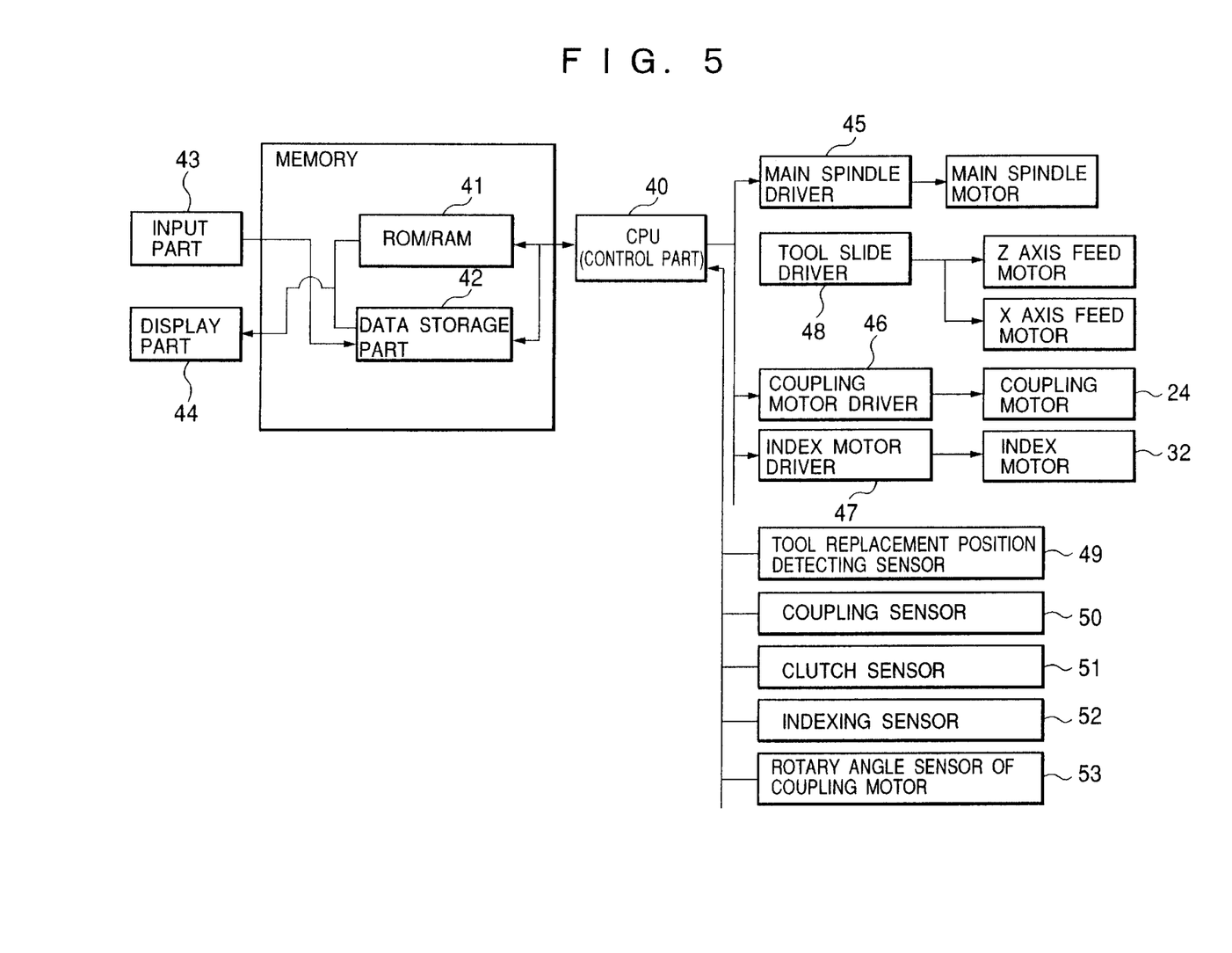
FIG. 5 is a block diagram showing a control system of the turret device.

FIG. 5 is a block diagram showing a control system of the aforementioned turret device 2.

As shown in the same figure, the control system of the turret device 2 includes a control part (CPU) 40, a ROM/RAM 41, a data storage part 42, an input part 43, a display part 44, a main spindle driver 45, a coupling motor driver 46, an index motor driver 47, a tool slide driver 48, a tool replacement position detecting sensor 49, a coupling sensor 50, a clutch sensor 51, an indexing sensor 52, and a rotary angle sensor 53 of the coupling motor 24.

A control program for driving the turret device 2 is stored in advance in the ROM/RAM 41. The control part 40 controls each component of the turret device 2 based on the control program. The input part 43 comprises a keyboard, etc., and data necessary for controlling each component of the turret device 2 (selection of tools, shapes and dimensions of the workpiece to be machined, rotating speed of the main spindle, feeding speed of tools, etc.) are inputted through the input part 43. This data can be inputted by entering numerical values on a drawing displayed on the display part 44 on an interactive basis.

Data inputted from the input part 43 and various data necessary for driving and controlling the turret device 2 are respectively stored in the storage part 42.

The control part 40 outputs a given command based on the control program stored in the ROM/RAM 41, on the selection of tools (indexing of the turret) as stored in the data storage part 42, and on machining data.

The main spindle driver 45 drives a main spindle motor based on commands issued from the control part 40 to rotate the workpiece held by the chuck 3 of the headstock 1. The workpiece is machined by the movement of the tool slide 4 in the directions of the Z and X axes and by rotation of the rotary tool 14 by the index motor 32, if necessary.

The tool slide driver 48 drives the feed motor in the directions of the Z and X axes based on commands issued from the control part 40 to drive the tool slide 4 of the turret device 2 in the directions of the Z and X axes.

The coupling motor driver 46 drives the coupling motor 24 based on a command issued from the control part 40 so as to permit the couplings 27a and 27b to engage with and disengage from each other and to permit the clutch pieces 31a and 31b to engage with and disengage from each other for positioning and fixing the turret 11.

The index motor driver 47 drives the index motor 32 based on a command issued from the control part 40 so as to execute the indexing of the turret 11 or rotary driving of the rotary tool 14. The rotary driving of the rotary tool 14 is carried out when the workpiece is machined while the indexing of the turret 11 is carried out when the tools are selected before or after the workpiece is machined.

The tool replacement position detecting sensor 49 detects whether the turret device 2 is positioned in a tool replacement position (i.e., a given backward position, namely, tool origin of the tool slide 4 where the turret 11 can be indexed) or not based on the coordinate showing the present position of the tool slide 4.

The coupling sensor 50 monitors the engagement and disengagement between the couplings 27a and 27b, and detects the increase of rotary torque of the couple motor 24 and outputs a coupling completion signal to the control part 40 upon completion of engagement between the couplings 27a and 27b. The clutch sensor 51 monitors the engagement and disengagement between the clutch pieces 31a and 31b, and outputs a clutch completion signal to the control part 40 when they engage with each other. The indexing sensor 52 monitors the rotary angle when the turret 11 is indexing, and outputs an indexing completion signal to the control part 40 when the indexing operation are completed at the angular position which is issued by the control part 40.

The rotary angle sensor 53 of the coupling motor 24 serves as a positioning displacement detecting means for detecting the positioning displacement between the couplings 27a and 27b when the turret 11 receives a load in the turning direction thereof.

As mentioned above, since the sensors 49 to 53 are structured to operate when detecting the rotary position of the servomotor or the variation of the rotary torque, a special sensor need not be provided.

The relation between forces applied to tooth profiles 27c and 27c of the couplings 27a and 27b will be now described with reference to FIG. 10A and FIG. 10B. That is, when a circumferential load F is applied to the tooth profiles 27c and 27c of the couplings 27a and 27b which engage with each other as shown in FIG. 9B, a load as shown in FIG. 10A or FIG. 10B is applied between the tooth profiles 27c and 27c.

Applied to the tooth profiles 27c and 27c of the couplings 27a and 27b which engage with each other is a pressing force P which is received from the pressing means comprising the coupling motor 24 and the screw feed mechanism 26 in the direction of the rotary center O, and a friction W between the tooth profiles 27c and 27c as well as the circumferential load F.

Figure 10A:
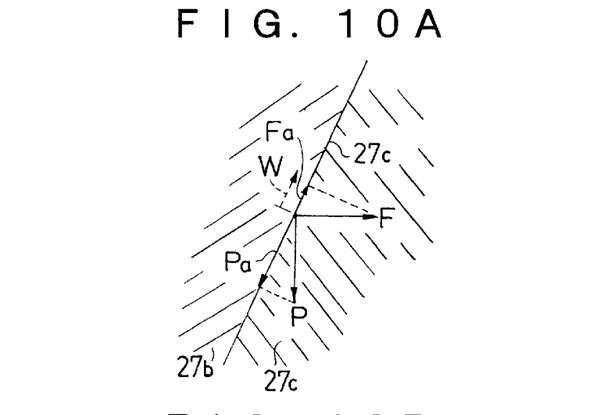
FIG. 10A and FIG. 10B respectively show vectors of a force applied to the tooth flank of respective positioning engaging members.

When the circumferential load F is small as shown in FIG. 10A and the sum of the component force Fa in the direction of the tooth profiles 27c of the circumferential load F and the friction W is smaller than a component force Pa of the pressing force P in the direction of the tooth profile 27c, one coupling 27b tends to sink toward the other coupling 27a along the tooth profile 27c, thereby forming a strong engagement between the couplings 27a and 27b.

Figure 10B:
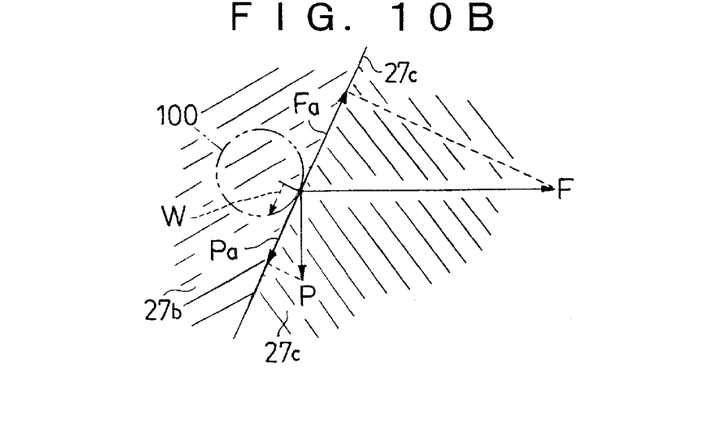

On the other hand, when the circumferential load F is large as shown in FIG. 10B and the component force Fa of the circumferential load F in the direction of the tooth profile 27c is larger than the sum of the component force Pa of the pressing force P in the direction of the tooth profile 27c and the friction W, one coupling 27b rises along the tooth profile 27c due to the component force Fa of the circumferential load F, thereby turning the coupling motor 24 reversely via the screw feed mechanism 26 so that the positional displacement of the coupling 27b occurs in the circumferential direction and also in the direction of the rotary center O.

In this embodiment, a deviation of the rotary angle θ which occurs when the coupling motor 24 is rotated reversely via the screw feed mechanism 26 is detected by the rotary angle sensor 53, thereby detecting the positional displacement which occurs in the coupling 27b.

That is, when the moveable side coupling 27b provided on the turret 11 receives a large circumferential load and sliding occurs between the tooth profiles of the couplings 27a and 27b, the nut 25 moves together with the turret 11 in the direction of the rotary center O so that the ball screw 21 screwed onto the nut 25 turns. The turning of the ball screw 21 is transmitted to the coupling motor 24 via the motive transmission gear 23 so that the deviation of the rotary angle θ occurs in the coupling motor 24. The deviation of the rotary angle θ is detected by the rotary angle sensor 53.

Although the pressing angle of the tooth profiles formed in the couplings 27a and 27b is considered to be about 20°, it is not limited thereto but can be appropriately adjusted considering the function required by the couplings 27a and 27b. For example, the pressing angle may be larger than 20°. In this case, the positioning displacement is liable to occur because the component force Fa of the circumferential load F increases further as shown in FIG. 10B.

One of the couplings 27a and 27b operates as in the case of the profiled tooth even if it comprises a pin or a roller as shown in an imaginary line 100 shown in FIG. 10B. Particularly, when one of the couplings 27a and 27b is formed of the roller, the friction W decreases, thereby enhancing the detecting accuracy by the rotary angle sensor 53.

Figure 6:
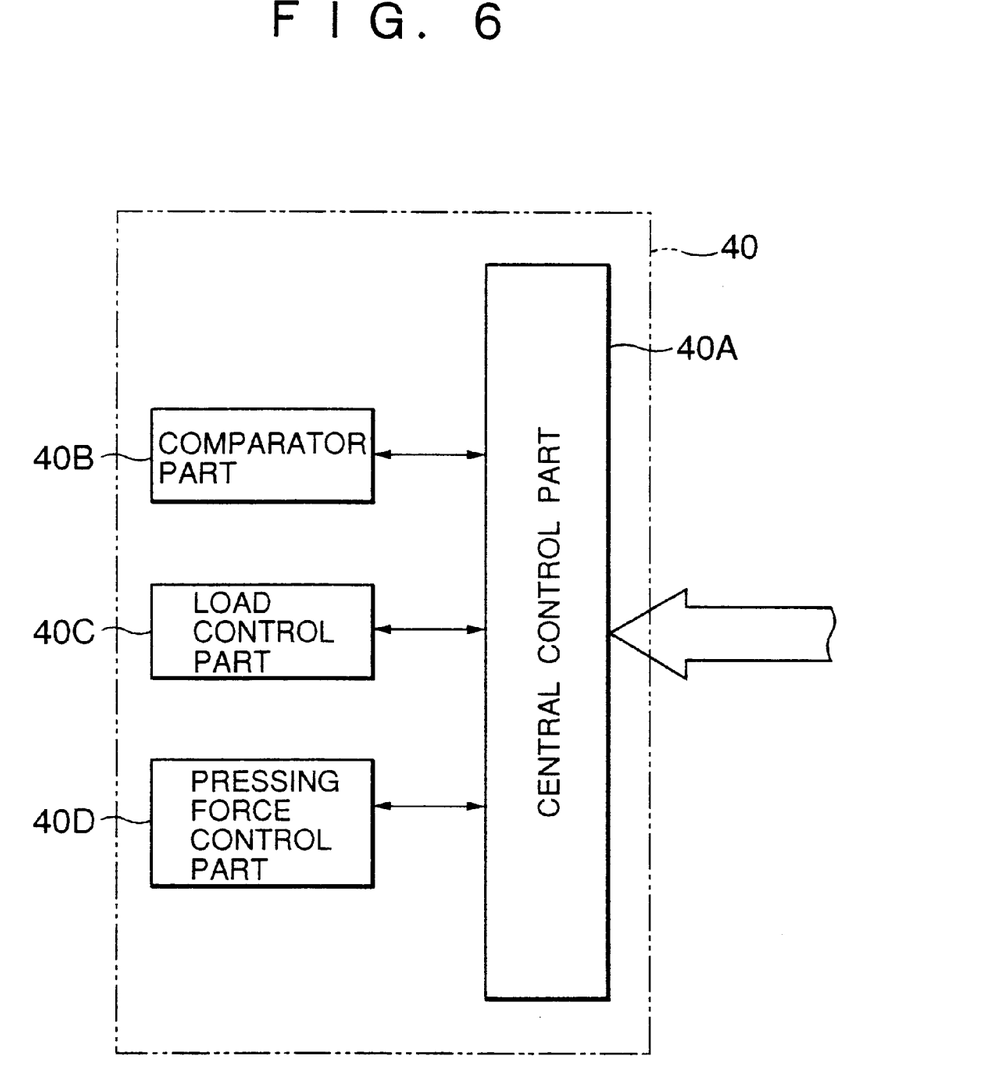
FIG. 6 is a block diagram showing a detailed arrangement of a control part of the control system in FIG. 5.

FIG. 6 is a block diagram showing the detailed arrangement of the control part 40 of the control system in FIG. 5.

As shown in the same figure, the control part 40 includes a comparator part 40B, a load control part 40C and a pressing force control part 40D as well as a central control part 40A for supplying commands to each component of the control system.

In the present embodiment, stored in advance in the data storage part 42 is a proper value and the maximum allowable value related to the positioning displacement which occurs between the couplings 27a and 27b. In more detail, these are a proper value $\theta_0$ of the rotary angle $\theta$ and the maximum allowable value $\theta_{max}$ after the positioning displacement is converted into the rotary angle $\theta$ of the coupling motor 24.

The comparator part 40B in the control part 40 compares the proper value $\theta_0$ and the maximum allowable value $\theta_{max}$ with the rotary angle $\theta$ (amount of positioning displacement) which is detected by the rotary angle sensor 53. The load control part 40C determines the difference between the rotary angle $\theta$ and the proper value $\theta_0$ based on the result of comparison by the comparator part 40B, and outputs a control command for increasing or decreasing the pressing force, which is applied to the pair of positioning engaging members 27, to the pressing force control part 40D via the central control part 40A, or discriminates whether the rotary angle $\theta$ exceeds the maximum allowable value $\theta_{max}$ or not, and then outputs an excessive load signal to the central control part 40A when the rotary angle $\theta$ exceeds the maximum allowable value $\theta_{max}$, so that the central control part 40A outputs a load decrease command to the tool slide driver 48 in response to the excessive load signal.

The feeding speed of the cutting tool 13 serving as the load generating source is delayed by the load decrease command, or the cutting depth is made shallow so as to decrease the cutting load, thereby decreasing the load applied to the turret 11. Alternatively, if the maximum allowable value $\theta_{max}$ is set to a critical value, causing a critical condition if the maximum allowable value $\theta_{max}$ exceeds the critical value, the cutting tool 13 is immediately moved away from the workpiece, thereby immediately removing the load applied to the turret 11 in the turning direction.

In response to a control command for increasing or decreasing the pressing force from the load control part 40C, the pressing force control part 40D outputs a command for increasing or decreasing an output torque of the coupling motor 24 to the coupling motor 24 via the central control part 40A and a coupling motor driver 46, or it calculates the rate of variation $d\theta$ with time relating to the positioning displacement (i.e. the rotary angle $\theta$ of the coupling motor) which occurs between the couplings 27a and 27b from the turning angle detected by the rotary angle sensor 53 and discriminates whether the positioning displacement tends to increase or decrease based on the rate of variation $d\theta$ and outputs a control command responsive to each tendency to the coupling motor 24 via the central control part 40A and coupling motor driver 46.

For a driving current I of the coupling motor 24, the maximum allowable value $I_{max}$ (the maximum output of the coupling motor 24) and the minimum allowable value $I_{min}$ (the minimum output of the coupling motor 24) are respectively stored in advance in the data storage part 42, thereby controlling the coupling motor 24 within these maximum and minimum allowable ranges.

Figure 7:
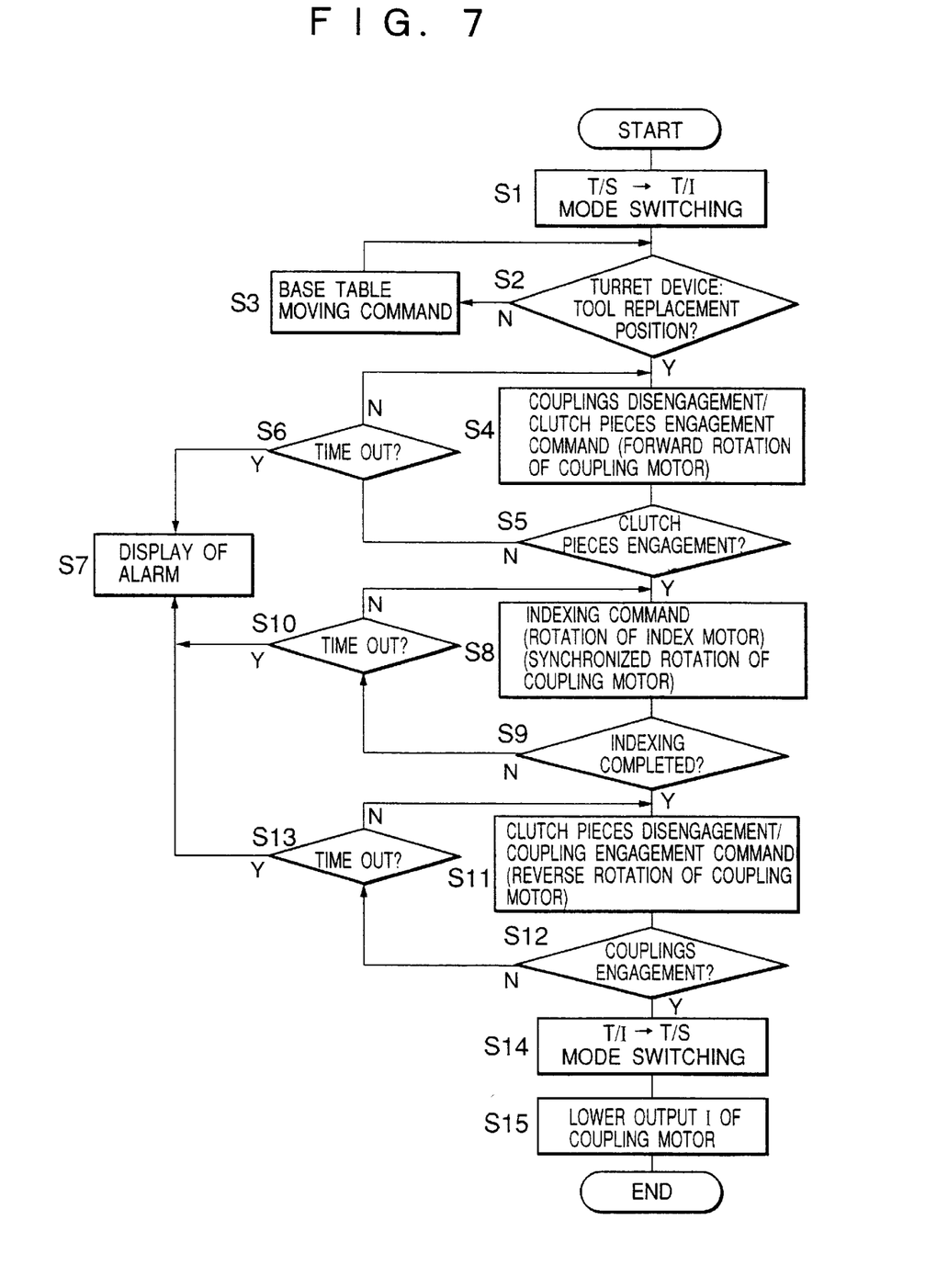
FIG. 7 is a flow chart showing the control operation of the turret device according to the control system in FIG. 5.

FIG. 7 is a flow chart showing a control operation for executing the indexing, positioning and fixation of the turret 11 (rotary table) of the turret device 2 (indexing device), and the rotary driving of the rotary tool 14 based on the control system having the structure set forth above. The control operation is executed mainly by the commands issued from the control part 40. Accordingly, the control operation set forth hereunder will be explained mainly with reference to the commands issued from the control part 40.

In the aforementioned turret device 2, the index motor 32 serves as a driving source for executing the indexing of the turret 11 and rotary driving of the rotary tool 14. Since the rotating speed and rotating direction of the index motor 32 are differentiated depending on the objects to be driven thereby, the control of the index motor 32 is divided into a mode (T/I mode) for indexing the turret 11 and another mode (T/S mode) for rotary driving the rotary tool 14, wherein control programs corresponding to each mode are stored in the ROM/RAM 41.

First, when the process for indexing the turret 11 is executed for selecting a succeeding tool upon completion of the cutting process, the control part 40 starts the indexing of the turret 11 upon confirmation of the completion of the cutting process, then switches the control program of the index motor 32 to the T/I mode (S1), and successively confirms whether the turret device 2 is positioned or not at present at the tool origin (a tool replacement position where the turret device 2 is rotated) (S2) in response to a signal issued from the tool replacement position detecting sensor 49. If the turret device 2 is not positioned at the tool origin, the control part 40 outputs a moving command signal to the tool slide driver 48 (S3), and then moves the tool slide 4 of the turret device 2 to the tool origin.

Upon confirmation that the turret device 2 is positioned at the tool origin, the control part 40 issues a driving command to the coupling motor driver 46 to drive the coupling motor 24 in the forward direction (S4). In this embodiment, a rotating direction of the coupling motor 24 for moving the nut 25 of the screw feed mechanism 26 in the forward direction (leftward in FIG. 2) is defined as the forward direction.

When the coupling motor 24 rotates in the forward direction, the driving force of the coupling motor 24 is transmitted to the ball screw 21 of the screw feed mechanism 26 via the motive motive transmission gear 23 shown in FIG. 2 so that the ball screw 21 turns. As the ball screw 21 turns, the nut 25 moves forward linearly (leftward) along the rotary center O.

Since the turret 11 is fixed to the nut 25, the turret 11 also moves forward linearly together with the nut 25. As a result, the couplings 27a and 27b of the positioning engaging member 27 provided between the base table 10 and turret 11 disengage from each other so that the turret 11 is rotatable.

At this time, the friction between the ball screw 21 and nut 25 of the screw feed mechanism 26 is sufficiently small compared with that between the base end portion 11a of the turret 11 and slide bearing 20 of the base table 10, so that the turret 11 does not rotate but moves forward linearly.

When the coupling motor 24 continues to rotate in the forward direction, clutch pieces 31a and 31b of the clutch member 31 engage with each other. In such a manner, upon completion of the engagement between the clutch pieces 31a and 31b, the rotary torque of the coupling motor 24 increases sharply so that a clutch completion signal is outputted from the clutch sensor 51 (S5).

Since the control part 40 has a timer function, it measures time counting from the time of issuance of the driving command to the coupling motor driver 46 (S6), and it decides that the apparatus is anomalous when the clutch completion signal is not inputted therein even if a given time elapses, then it stops the operation of the turret device 2, then indicates an alarm (S7).

Meanwhile, when the clutch completion signal is inputted within a given time, the control part 40 stops the rotation of the coupling motor 24, then issues a driving command to the index motor driver 47 (S8), thereby rotating the index motor 32 in the rotating direction and rotating angle which are determined by the present tool fixing position and the tool fixing position to be selected next. The driving force of the index motor 32 is transmitted to the turret 11 by way of the gear mechanism 33, annular gear 29, and clutch pieces 31a and 31b. Based on this driving force, the turret 11 is indexed to the tool fixing position to be selected next.

Meanwhile, when the turret 11 is indexing by the driving force of the index motor 32, the nut 25 of the screw feed mechanism 26 fixed to the turret 11 is turned together with the turret 11. When the relative turning occurs between the nut 25 and ball screw 21, the ball screw 21 moves relatively linearly along the rotary center O by the relative turning of the nut 25. However, the ball screw 21 is prevented from moving in the direction of the rotary center O by the rolling bearing 22. As a result, the nut 25 moves and the turret 11 moves in the direction of the rotary center O.

When the turret 11 moves rightward by the screw feed mechanism 26, the turret side coupling 27b interferes with the base table side coupling 27a while it rotates so that the index motor 32 does not rotate, while when the turret 11 moves leftward, the clutch piece 31a is strongly pressed against the clutch piece 31b which engages with the clutch piece 31a so that the index motor 32 does not rotate.

Accordingly, in the preferred embodiment, the coupling motor 24 rotates in a given rotating direction with a given ratio of rotating speed so as not to rotate the ball screw 21 and nut 25 of the screw feed mechanism 26 relative to each other in synchronization with the rotation of the index motor 32 for indexing the turret 11.

The ratio of rotating speed and rotating direction between the index motor 32 and coupling motor 24 are respectively determined by the ratio of a train of gears and rotating direction of gears extending from the index motor 32 to annular gear 29 (turret 11) and those extending from the coupling motor 24 to ball screw 21, and by a control program stored in the ROM/RAM 41.

When the indexing of the turret 11 is completed in such a manner, the control part 40 detects the rotating position of the index motor 32 so that an indexing completion signal is issued from the indexing sensor 52 (S9).

The control part 40 measures time counting from the time of issuance of the driving command to the index motor driver 47 (S10), and it decides that the apparatus is anomalous when the clutch completion signal is not inputted therein even if a given time elapses, then it stops the operation of the turret device 2, then indicates an alarm (S7).

Meanwhile, when the indexing completion signal is inputted within a given time, the control part 40 stops the rotation of the index motor 32, then issues the driving command to the coupling motor driver 46 to rotate the coupling motor 24 in an opposite direction (S11).

When the coupling motor 24 rotates in the opposite direction, the driving force of the coupling motor 24 is transmitted to the ball screw 21 of the screw feed mechanism 26 via the motive motive transmission gear 23 shown in FIG. 2 to turn the ball screw 21 in the opposite direction. As the ball screw 21 turns in the opposite direction, the nut 25 and turret 11 move backward (rightward in FIG. 2) linearly along the rotary center O. As a result, the clutch pieces 31a and 31b disengage from each other.

When the coupling motor 24 continues to rotate in the opposite direction, the couplings 27a and 27b engage with each other as shown in FIG. 3. Upon completion of the engagement between the couplings 27a and 27b, the rotary torque of the index motor 32 increases sharply so that the coupling completion signal is issued from the coupling sensor 50 (S12).

The control part 40 measure time counting from the time of issuance of the reverse rotation driving command to the coupling motor driver 46 (S13), and it judges that the apparatus is anomalous and stops the operation of the turret device 2, then indicates an alarm when the coupling completion signal is not inputted even if a given time elapses (S7).

Meanwhile, since the selection of the next tool is completed when the coupling completion signal is inputted within a given time, the control part 40 switches the control mode of the succeeding index motor 32 to the rotary driving mode (T/S mode) of the rotary tool 14 (S14) and lowers the output torque of the coupling motor 24 (S15). The output torque of the coupling motor 24 is applied between the couplings 27a and 27b via the screw feed mechanism 26, and it is decreased to a torque (holding torque) for sufficiently keeping the engagement between the couplings 27a and 27b. According to the preferred embodiment, since the couplings 27a and 27b comprise curvic couplings, and the linear motion of the turret 11 is performed by the screw feed mechanism 26, the holding torque can be reduced to a sufficiently small torque.

With the operations set forth above, a series of operations for tool replacement is completed, and thereafter the cutting process is carried out.

Next, the control operation of the turret device (indexing device) 2 during the cutting process of the workpiece by the cutting tool 13 will be now described with reference to FIG. 8.

Figure 8:
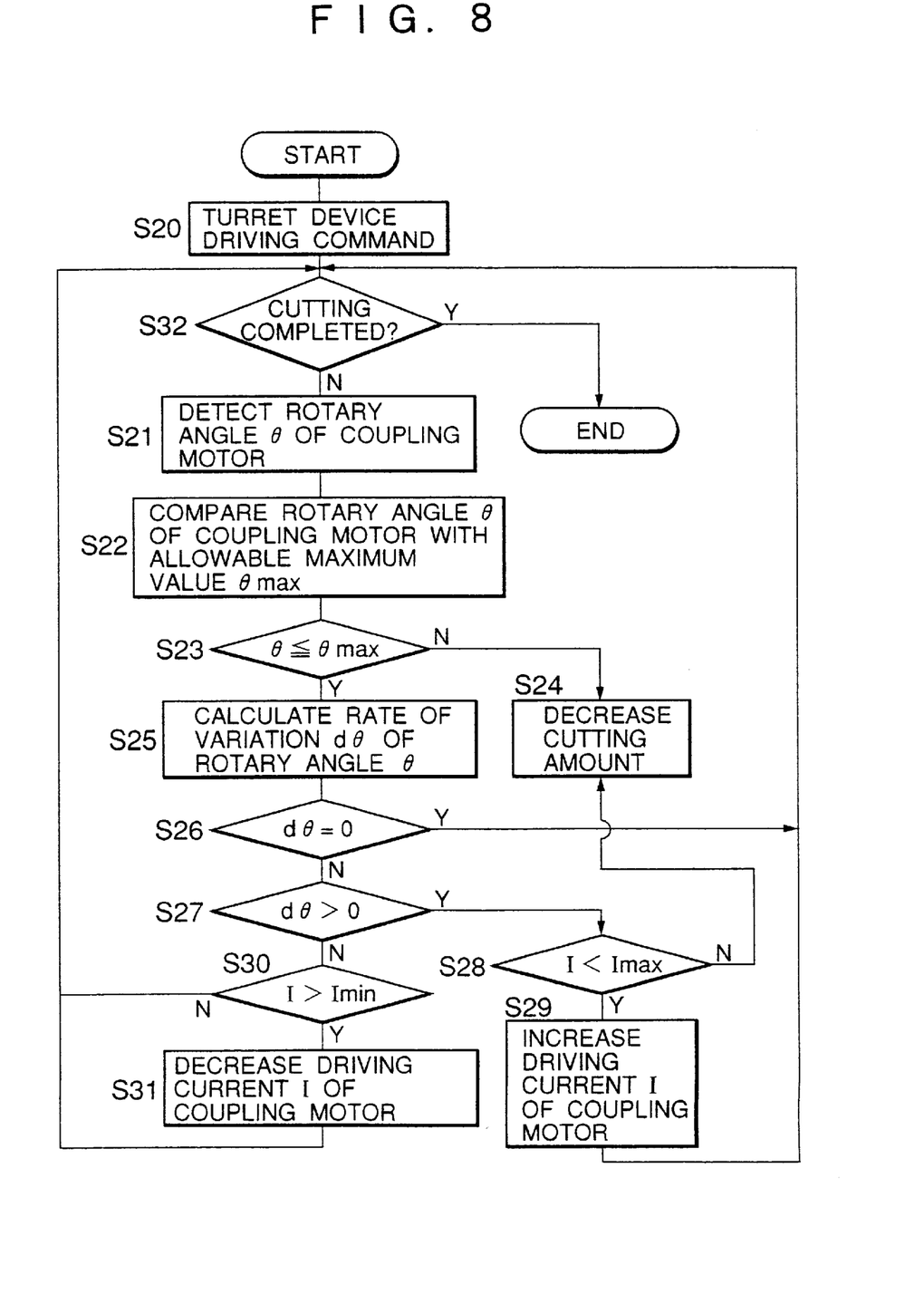
FIG. 8 is a flow chart showing the control operation of the pressing force owing to the positioning displacement in the turret device.

FIG. 8 is a flowchart showing the operation for controlling the turret device 2.

First, a driving command is issued from the control part 40 to the spindle driver 45 as shown in FIG. 5 so as to drive and rotate the main spindle motor (not shown) incorporated in the headstock 1, while the driving command is also issued from the control part 40 to the tool slide driver 48 so as to drive the base table 10 so that the cutting tool 13 starts the cutting process of the workpiece (S20).

As shown in FIG. 2, when the cutting tool 13 contacts the workpiece to perform the cutting process, a load is applied to the cutting tool 13 and the turret 11 for holding the cutting tool 13 in the turning direction depending on various conditions such as the cutting depth or feeding speed, etc., of the cutting tool 13. The load in the turning direction is transmitted to the coupling 27b secured to the turret 11, and it is applied between the couplings 27a and 27b which engage with each other as the circumferential load F (see FIG. 9B).

The coupling 27b secured to the turret 11 tends to rise along the tooth profile 27c due to the circumferential load F. As a result, the positioning displacement occurs in the turret 11 as well as in the coupling 27b. In this embodiment, the control is executed according to the positioning displacement in the direction of the rotary center O as set forth above.

That is, when the positioning displacement occurs in the turret 11 in the direction of the rotary center O, the coupling motor 24 is rotated via the screw feed mechanism 26 and the motive motive transmission gear 23. The rotary angle θ is detected by the rotary angle sensor 53 shown in FIG. 5 (S21), and the detected signal is supplied to the control part 40.

Subsequently, the comparator part 40B in the control part 40 (see FIG. 6) compares the rotary angle θ detected by the rotary angle sensor 53 with the maximum allowable value θ$_{max}$ which is stored in advance in the data storage part 42 (S22), and the load control part 40C discriminates whether the rotary angle θ exceeds the maximum allowable value θ$_{max}$ or not based on the result of comparison (S23).

If the rotary angle θ exceeds the maximum allowable value θ$_{max}$, the pressing force control part 40D supplies a command for delaying the feeding speed or making the cutting depth shallow to the tool slide driver 48 through the central control part 40A, and then decreases the cutting amount by the cutting tool 13 serving as the load generating source, and finally decreases the load applied to the turret 11 (S24).

If the rotary angle θ does not exceed the maximum allowable value θ$_{max}$, the pressing force control part 40D in the control part 40 calculates the rate of variation dθ of the rotary angle θ with respect to time based on the signal detected by the rotary angle sensor 53 (S25), and discriminates whether the rotary angle θ, i.e. the positioning displacement of the turret 11, tends to increase or decrease based on the rate of variation dθ.

For example, if the rate of variation do is equal to 0 (S26), the rotary angle θ does not vary with time, and at that time the program returns to step S32 shown in FIG. 8 where the control operation continues until the cutting operation ends.

On the other hand, if the rate of variation dθ is greater than 0 (S27), it is judged that the rotary angle θ tends to increase, thereby increasing the driving current I of the coupling motor 24 provided that the driving current I of the coupling motor 24 does not exceed the maximum allowable value I$_{max}$ (S28) so that the torque of the coupling motor 24 increases in the reverse rotating direction (in the direction for fastening the couplings 27a and 27b) (S29). As a result, the pressing force applied between the couplings 27a and 27b becomes large, thereby solving the increasing tendency of the positioning displacement. Thereafter, the program returns again to step S32 as shown in FIG. 8 where the control operation continues until the cutting operation ends.

In the control operation when the rotary angle θ tends to increase, a command for delaying the feeding speed or a command for making the cutting depth shallow is outputted from the pressing force control part 40D to the tool slide driver 48 through the central control part 40A if the driving current I of the coupling motor 24 exceeds the maximum allowable value I$_{max}$ (S28), thereby decreasing the cutting amount by the cutting tool 13 serving as the load generating source so as to decrease the load applied to the turret 11 (S24). Thereafter, the program returns again to step S32 as shown in FIG. 8, and the control operation continues until the cutting operation ends.

If the rate of variation dθ is less than 0 (S27), it is judged that the rotary angle θ tends to decrease, thereby decreasing the driving current I of the coupling motor 24 to the extent that the driving current I of the coupling motor 24 is not less than the minimum allowable value I$_{min}$ (S30), thereby decreasing the torque in the reverse rotating direction of the coupling motor 24 (in the direction for fastening the couplings 27a and 27b) (S31). As a result, the pressing force applied between the couplings 27a and 27b becomes small to solve the decreasing tendency of the positioning displacement. Thereafter, the program returns again to step S32 as shown in FIG. 8, and the control operation continues until the cutting operation ends.

In the control operation when the rotary angle θ tends to decrease, if the driving current I of the coupling motor 24 is less than the minimum allowable value I$_{min}$ (S30), the program returns again to step S32 shown in FIG. 8 where the control operation continues until the cutting operation ends without adjusting the driving current I of the coupling motor 24.

In the aforementioned embodiment, the pressing means for pressing the couplings 27a and 27b in the axial direction to permit them to engage with each other is formed of the screw feed mechanism 26 and the coupling motor 24, but it may be formed of an actuator such as a hydraulic cylinder or pneumatic cylinder.

Further, according to the aforementioned embodiment, if the rotary angle θ exceeds the maximum allowable value θ$_{max}$ or the driving current I of the coupling motor 24 exceeds the maximum allowable value I$_{max}$, the cutting amount by the cutting tool 13 is decreased to decrease the load applied to the turret 11. However, if there is a possibility that the indexing device will be damaged or that the security thereof will be impaired, the cutting tool 13 may be moved away from the workpiece to immediately remove the load applied to the turret 11.

Still further, according to the maximum allowable value θ$_{max}$ in the aforementioned embodiment, if the rotary angle θ exceeds the maximum allowable value θ$_{max}$, the load applied to the turret 11 is decreased. However, the load applied to the turret 11 may be decreased if the rotary angle θ exceeds the proper value θ$_0$ according to the proper value θ$_0$.

According to the indexing device and the method of controlling the same of the aforementioned embodiment, if the pressing force applied to the positioning engaging members 27 is controlled properly depending on the load applied to the turret 11, the abrasion of the positioning engaging members 27 may be decreased, and also the driving source for applying the pressing force to the positioning engaging members 27 may be restrained from generating heat.

Furthermore, if the present invention is applied to the turret device like the aforementioned embodiment, the cutting load is varied depending on processes so that the load applied to the turret 11 is also varied. Even in such a case, the pressing force applied to the positioning engaging members 27 can be always set to a proper value.

More still further, in the case of the turret device, if the cutting amount by the cutting tool 13 is decreased or the feeding speed of the cutting tool 13 is delayed, the positioning displacement which occurs between the positioning engaging members 27 can be set to a value not to exceed the maximum and minimum allowable values, thereby enhancing availability without stopping the cutting operation.

In general, the delay of the feeding speed by the cutting tool 13 dispenses with the change of the moving passage of the cutting tool which is specified by a processing program, so that the control is easily performed and is preferable. However, if a screw is cut or a plurality of processings are executed simultaneously, there is the case that it is preferred to decrease the cutting amount by the cutting tool 13.

INDUSTRIAL APPLICABILITY

When the present invention is applied to an indexing device such as the turret device used by lathes, particularly when a pressing force is applied to positioning engaging members which fix or freely turn, the rotary table of the indexing device can be controlled properly depending on the load applied to the rotary table in the turning direction.

What is claimed is:

1. An indexing device comprising a base table, a rotary table which indexes about a given rotary center relative to the base table, a pair of positioning engaging members provided between the base table and the rotary table, at least one of said positioning engaging members having inclined tooth profiles, said positioning engaging members being engageable with and disengageable from each other relative to said tooth profiles when said positioning engaging members move in axial directions thereof relative to each other, and a pressing means for pressing at least one of said pair of positioning engaging members in the axial direction thereof to permit one of said positioning engaging members to engage with the other positioning engaging member, wherein said indexing device further comprises:

a positioning displacement detecting means for detecting positioning displacement which occurs between said pair of positioning engaging members when one of said positioning engaging members slides along inclinations of said tooth profiles when the rotary table receives a load; and a pressing force control means for controlling a pressing force of the pressing means in response to an output of said positioning displacement detecting means.

2. A method of controlling an indexing device comprising a base table, a rotary table which indexes about a given rotary center relative to the base table, a pair of positioning engaging members provided between the base table and rotary table, at least one of said positioning engaging members having inclined tooth profiles, said pair of positioning engaging members being engageable with and disengageable from each other relative to said tooth profiles when said positioning engaging members move in axial directions thereof relative to each other, wherein said method comprises:

maintaining meshing between said tooth profiles by applying a pressing force to at least one of said positioning engaging members; and detecting positioning displacement which occurs between said pair of positioning engaging members when the rotary table receives a load, and adjusting the pressing force applied to the positioning engaging members based on a result of detection.

3. The method of controlling the indexing device according to claim 2, said method further comprising:

calculating a rate of variation of the positioning displacement with time which displacement occurs between the positioning engaging members when said positioning engaging members engage with each other, increasing the pressing force when the positioning displacement tends to increase, and decreasing the pressing force when the positioning displacement tends to decrease.

4. The method of controlling the indexing device according to claim 2, said method further comprising:

providing a maximum allowable value of the positioning displacement which occurs between the positioning engaging members when said positioning engaging members engage with each other and adjusting the pressing force applied to the pair of positioning engaging members within a given range not to exceed the maximum allowable value; and decreasing the load applied to the rotary table when the positioning displacement which occurs between the positioning engaging members exceeds the maximum allowable value or said pressing force exceeds an upper limit of the given range.

* * * * *